United States Patent [19]

Sisk

[11] Patent Number: 5,617,907
[45] Date of Patent: Apr. 8, 1997

[54] RECESSED NUT BAR

[76] Inventor: David E. Sisk, 7353 Hillsboro Rd., Bonne Terre, Mo. 63628

[21] Appl. No.: 585,492

[22] Filed: Jan. 16, 1996

[51] Int. Cl.[6] ............................................. B65B 1/04
[52] U.S. Cl. ........................ 141/340; 141/386; 285/414
[58] Field of Search ......................... 141/331–346, 141/363, 364, 383, 386; 285/363, 368, 405, 412, 414; 222/460

[56] References Cited

U.S. PATENT DOCUMENTS

| D. 283,265 | 4/1986 | Preskey et al. . | |
|---|---|---|---|
| D. 297,678 | 9/1988 | Sisk . | |
| 1,806,710 | 5/1931 | Ross, Jr. | 285/414 |
| 3,752,509 | 8/1973 | Stafford | 285/414 |
| 4,215,880 | 8/1980 | Trittipoe | 285/414 |
| 4,648,628 | 3/1987 | Meadows et al. . | |
| 4,848,396 | 7/1989 | Sisk . | |
| 4,889,318 | 12/1989 | Sisk . | |
| 5,387,015 | 2/1995 | Sisk . | |

*Primary Examiner*—Renee S. Luebke
*Assistant Examiner*—Steven O. Douglas
*Attorney, Agent, or Firm*—Paul M. Denk

[57] ABSTRACT

A shallow conic shaped outlet fitting for containers having material to discharge through a valve fitting into a flow directing pipe. The conic fitting and the flow directing pipe each have flanges to hold the valve fitting in position, and headed bolts serve to secure the pipe flange and the conic fitting in a compact assembly utilizing nut bars on the flange for the conic fitting to receive the threaded ends of the headed bolts thereby eliminating the usual undividual bulky nuts to engage the threaded ends of the bolts.

6 Claims, 2 Drawing Sheets

RECESSED NUT BAR

BACKGROUND OF THE INVENTION

This invention is directed to attachment flanges associated with cone shaped outlet fitting for material carrier containers, and more particularly to an arrangement of nut bars on flanges in which the cone shaped outlets are exceptionally shallow to prevent the use of the usual separate bolt and nuts to secure outlet control valve devices to the flange on shallow cone shaped container outlet fittings.

There are numerous situations in the prior art of material carrying containers having cone shaped outlets that require suitable ground clearance dimension, particularly on container supporting vehicles. The ground clearance problem is especially noticeable, as the cone shaped outlets must have angular slopes to encourage the discharge of the contents of the containers.

In certain containers on vehicle carriers it is especially important to provide outlets which have minimum conic slopes for the outlets to improve carrying capacity without compromising ground clearance dimensions. The problem with minimum ground clearance slopes is that it is particularly troublesome to achieve sufficient clearance space between the flat flange surface and the adjacent conic slope which must meet the flat flange with enough room to receive nuts for threaded end of bolts and also permit wrench tools to engage the nuts intended to hold the bolts in proper load carrying position. Steeper conic slopes will make room for bolt nuts at the sacrifice of obtaining improved carrying capacity for the containers and better ground clearance to allow for larger outlet conduits which improves the complete emptying of the material so that contaminants of material is avoided.

BRIEF DESCRIPTION OF THE INVENTION

In satisfying the foregoing problem, the invention resides in a shallow sloped conic outlet fitting for a container having an attachment supporting flange which performs the function of receiving the threaded ends of bolts so that separate standard nuts are thereby eliminated.

A further object of the invention is to employ nut bars carried by the conic shaped outlet flanges to receive and secure the threaded ends of bolts which are employed to retain outlet devices on the flanges.

A further object of the invention is to provide socket spaces in the outlet flanges to receive nut bars having threaded apertures to receive and hold attachment devices with adequate ground clearance provisions.

Other objects of the invention will be set forth in the following description of a preferred embodiment employing nut bars mounted on flanges associated with shallow sloped conic outlet fittings.

DESCRIPTION OF THE PREFERRED EMBODIMENT

Figure 1:
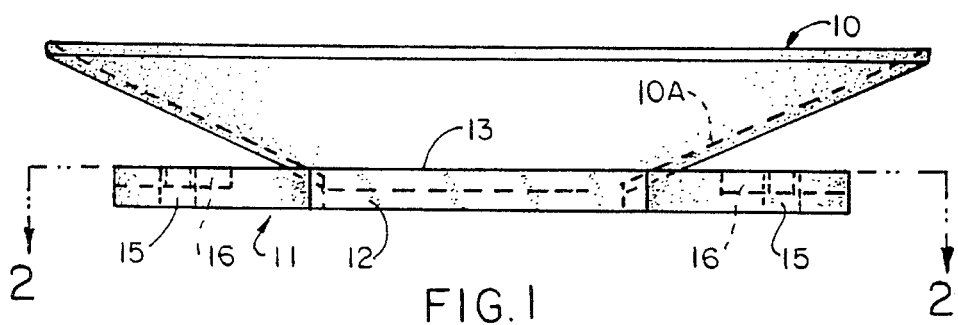
FIG. 1 is a vertical side elevation of a shallow sloped conic outlet having a flange to receive desired attachment securing threaded bolts which avoid nuts.

In FIG. 1, a shallow sloped conic shaped outlet fitting 10 for a tank trailer is provided with a flange 11 secured with an outlet bore 12 secured in alignment with the outlet opening 13 in the fitting 10. The internal surface 10A of the sloped fitting guides material to said outlet opening 13. The attachment of the flange 11 may be by suitable welding technique. The fitting is formed of stainless steel having an outlet and an inner conic slope surface of the order of 15° which will direct and encourage the discharge of material through the outlet opening 13.

Figure 2:
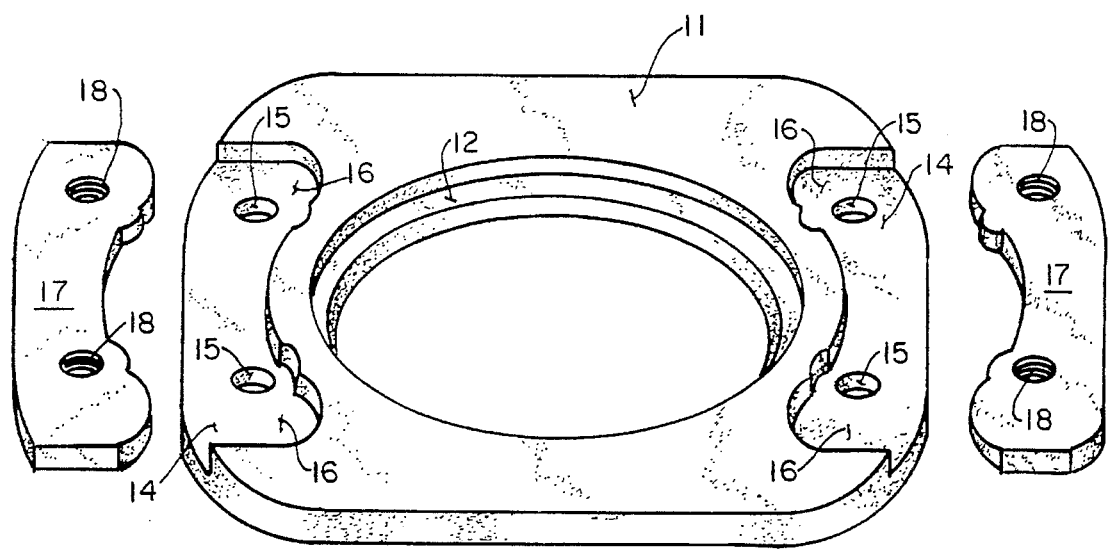
FIG. 2 is an exploded perspective view of the flange mounted nut bars adapted to seat in flange recesses, and attachment bolts to engage in certain of the nut bar threaded apertures, the view being taken along line 2—2 in FIG. 1.
Figure 2:

Comparing FIGS. 1 and 2, which represent the preferred embodiment of the inveniton, it is easily seen that the flange11 is recessed part way into its thickness, as along opposite sides of the outlet opening 12. Each socket 14 is formed with pair of straight bolt receiving apertures 15, one aperture adjacent enlarged spaces 16. Each socket 14 is shaped to receive a similarly shaped nut bar 17 which complementarily fit snugly into the respective socket 14.

Each nut bar is formed with a pair of threaded apertures 18 which align over the apertures 15 in the sockets 14. Thus, the threaded apertures 18 function as nuts to be engaged with the threaded ends 19 of headed bolts 20 which can be easily exposed to receive a suitable wrench or similar tool (not necessary to illustrate). A full complement of bolts 20 is understood to be needed.

Figure 3:
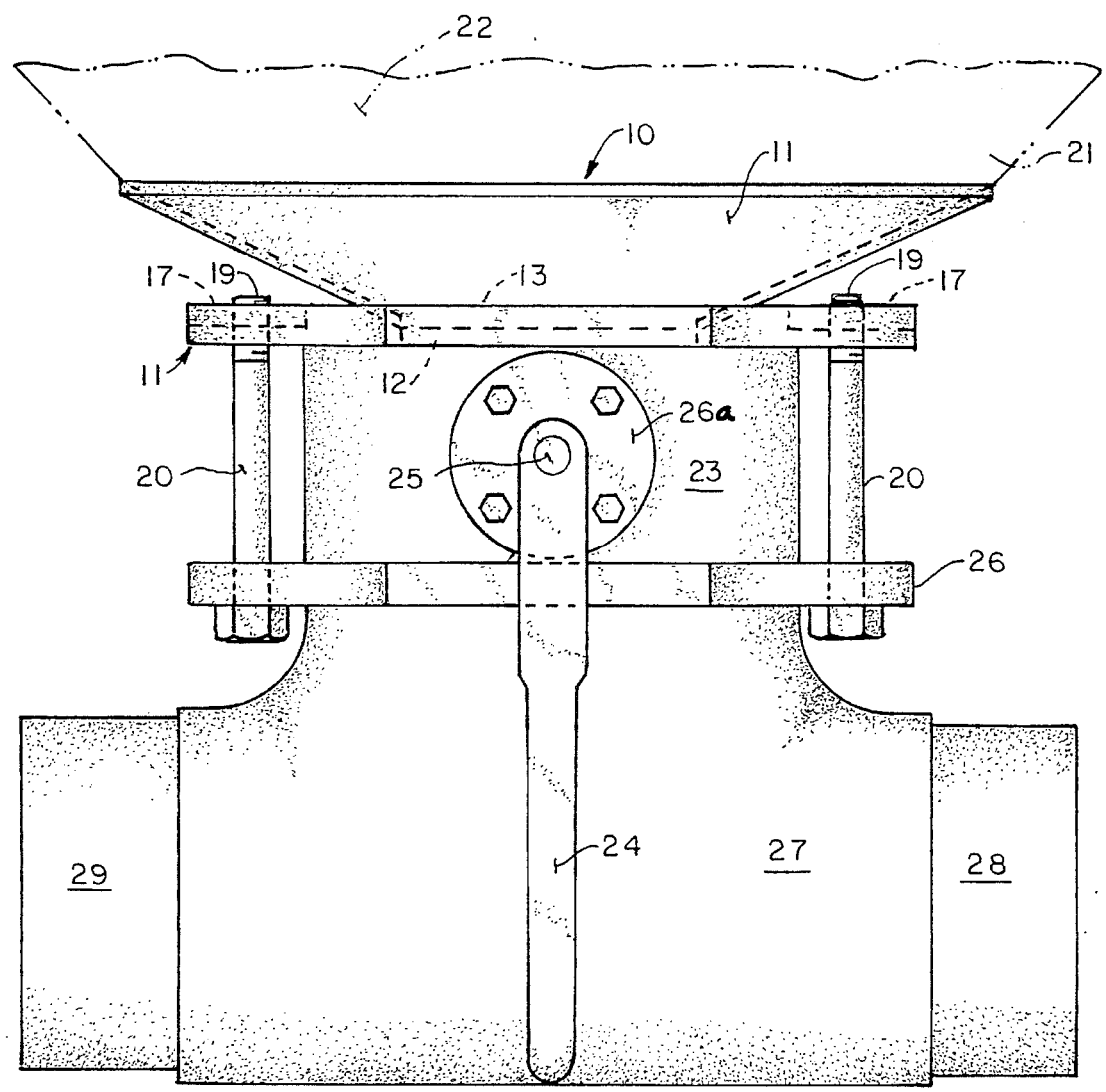
FIG. 3 is a vertical side view of the attachment of an outlet valve to the flange of the shallow conic outlet fitting.

The utility of the nut bar 17 is shown in FIG. 3 with the shallow conic outlet fitting 10 position to be secured to a bottom 21 of a material container 22 so that the material place in the container will readily slide on the fitting to the outlet opening 13 registered with the flange 11. In the view of FIG. 3, a valve unit 23 is positioned with its upper open end registered with the opening 12 in the flange 11 and pressed into tight abutment on the flange 11. The valve Unit 23 is provided with a butterfly valve element (not shown but of a well known character) which is movable in response to a handle 24 having a connection with the outer end of the valve shaft 25 projecting from the valve casing 26a. The valve unit 23 is also in tight abutment on the flange 26 of a T discharge fitting 27 having opposite discharge openings 28 and 29 should the discharge from the container 22 be selected to exit in either direction.

The assembly seen in FIG. 3 is maintained by the positioning of bolts 20 up through suitable apertures (not shown) in the flange 26 on fitting 27. Those bolts 20 have the threaded ends 19 engaged in the threaded apertures 18 in the nut bars 11. On suitable tightening of the bolts 20, the valve is tightly secured between the flange 11 on the fitting 10 and the flange 26 on the T fitting 27.

The preferred embodiment of the invention is seen in disassembled perspective view in FIG. 2 and shown in a utility setting in FIG. 3. Variations from the embodiment may come to mind in view of the scope of the invention hereinafter defined.

I claim:

1. In a material discharge fitting for a container, the combination comprising:

a) a conic shaped-outlet fitting having a sloped surface with a discharge opening;

b) a flange secured to said outlet fitting with an inline outlet opening;

c) recessed sockets in said flange on opposite sides of said flange outlet opening, said sockets having bolt receiving apertures opening therethrough to face said sloped surface; and d) nut bars shaped to fit into said sockets, said nut bars each having threaded apertures therethrough in alignment with said bolt receiving apertures to allow bolts to pass through said bolt receiving apertures and threadedly engage in said threaded apertures.

2. The combination set forth in claim 1 wherein said conic shaped outlet fitting provides an internal sloped surface surrounding said discharge opening to guide material into said discharge opening.

3. The combination set forth in claim 1 wherein said flange secured to said outlet fitting extends outwardly to be spaced from said conic shaped surface of said fitting at an angle of substantially 15°, and said bolt receiving apertures being oriented to open beneath said sloped surface of said outlet fitting.

4. The combination set forth in claim 3 wherein said threaded end of said bolt engaged in said bolt receiving threaded aperture is spaced from said sloped surface to prevent normal nuts to be displaced under said sloped surface for engagement by a bolt threaded end.

5. A material container having a material discharge control assembly comprising a cone shaped bottom fitting for the container, said bottom fitting having an opening surrounded by a flange; a discharge directing fitting having a separate flange spaced from said bottom fitting flange; a material control fitting positioned in abutment between said bottom fitting flange and said discharge directing fitting separate flange; nut bars carried by said bottom fitting flange; and attachment bolts having headed ends engaged on said discharge fitting separate flange and threaded ends engaged in said nut bars carried by said bottom fitting flange, said attachment bolts clamping said material control fitting in abutment between said bottom fitting flange and said separate flange.

6. The material discharge control assembly set forth in claim 5 in which said nut bars are initially loose in said bottom fitting clange and become fixed by engagement with said bolt threaded ends.

* * * * *